Patented Dec. 19, 1944

2,365,335

UNITED STATES PATENT OFFICE 2,365,335

HARD RUBBER MATERIALS CAPABLE OF READY FABRICATION

Edward R. Dillehay, Glen Ellyn, Ill., assignor to The Richardson Company, Lockland, Ohio, a corporation of Ohio No Drawing. Application May 27, 1941, Serial No. 395,447

1 Claim. (Cl. 260—3)

The invention has to do with hard rubber materials employed for electrical insulation. The desirability of hard rubber for this use has long been known; the hard rubber sheet stock made of rubber, sulphur, accelerator lime, and rubber dust, with sometimes a small amount of aluminum powder for appearance and color, is on the market. A difficulty with this material is, however, that it is difficultly fabricatable. It will not punch cleanly without upsetting or burring; and it is characterized by considerable cold flow which tends to impair the flatness of the pieces.

The primary object of my invention is the provision of a stock, for moulding, or for the formation of sheets and panels which has a high electrical insulative value, a low power factor, a high physical strength, a high dielectric strength, and at the same time is readily and cleanly fabricatable by shearing, punching, bending, grinding and the like, and is characterized by less cold flow and a lesser degree of unwanted deformation.

This and other objects of my invention which will be set forth hereinafter or will be apparent to one skilled in the art upon reading this specification, I accomplish by that certain procedure and in that composition and article of which I shall now describe an exemplary embodiment.

I have found that rubber stocks can be increased as to their workability in the sense of punching, shearing, grinding or the like, by the inclusion of relatively small amounts of various filler materials, and that a number of such materials may be added without decreasing materially the electrical properties of the stock. For example, a relatively small amount of such a material as Pyrax talc will produce a marked increase in workability in the sense set forth above while retaining the valuable electrical properties, and at a relatively small decrease of physical strength.

But difficulties with mineral fillers in general are found first in that they tend to diminish the strength of the article, and second in that proportionately to their abrasive character and content they tend to give poor die life. This invention is directed not only to the production of a composition which will be workable and stiff enough to retain its form, but to the securing of these qualities in a material which will at the same time be fully as strong as the usual hard rubber stocks, and which can be extensively worked without any greater wear on the dies and tools than that encountered with the usual hard rubber stocks.

As a result of extensive experimentation I have found that these qualities may be attained through the use, with the rubber, of a finely divided dielectric material of organic rather than inorganic character, as will hereinafter be set forth. In particular, I have found that a rubber composition containing a resinous material acting primarily as a filler, admirably serves the purposes of the invention.

In practicing my process, I first make a synthetic resin, which may be any of the known resins of thermo-setting type. For cost, as well as because of other factors, I prefer to use a resin of the phenol-formaldehyde type. I form it by reacting phenol or cresol or both with equal molecular parts of formaldehyde, and separating the water of the reaction as is usual in the formation of an intermediate stage, incompletely polymerized resin. Thereafter, however, I carry the polymerization of the resin to completion, to fully set up the resin. This can be done in any way desired, as by merely curing the material under heat in suitable shallow pans in an oven or the like. It is necessary, however, that the cure be complete. The material must be brought to such condition of polymerization that, under the heat and pressure of the subsequent moulding of the finished rubber sheet or article, the resin will not give off further moisture. I have found that the evolution of moisture in a dielectric rubber moulding composition of the class to which this invention relates, or the presence of moisture therein will impair the dielectric properties of the finished article.

While it is possible to include filler materials in the resin—and my invention is not exclusive thereof—I do not ordinarily do so, and have found that it is undesirable to include in the resin any materials which would cause the resin to be hygroscopic or absorptive of moisture.

The completely cured resin is next pulverized or ground in any suitable machine, grinder, pulverizer or attrition mill to a relatively fine and uniform state of subdivision. The fineness is not critical. For most materials for dielectric uses, the powdered, cured resin should pass, say, a screen of 100 meshes to the inch; and the resin I am employing in regular practice is about a 200 mesh material.

The completely cured, pulverized resin is used as a special filler in hard rubber compositions. The compositions, likewise may be considerably varied for different uses and different conditions. An exemplary formula is as follows:

| | Pounds |
|---|---|
| Smoked sheet | 50 |
| Lime | 2 |
| Accelerator | .5 |
| Sulphur | 24 |
| Cured phenolic resin powder | 20 |
| Hard rubber dust | 15 |

Such a composition may be compounded and cured by the current procedures in the art, and when compounded may either be moulded and cured under heat and pressure in a closed mould, or may be formed into sheets or panels in any of the ways usual in the art. If treated in accordance with my co-pending application Ser. No. 309,422, filed December 15, 1939, now Patent No. 2,310,619, dated February 9, 1943, it may be pressed and cured between pressing pans after the manner of making resinous laminated stocks.

Material of the formula given above, when formed into sheet stock and cured, gives a product which is quite stiff, has substantially no cold flow, and is easily cut, machined, punched or stamped, with little wear on the tools. It is usual to warm rubber composition articles somewhat, say to 150° F. when stamping or punching them, and in such condition my material may not only be worked in any of the ways mentioned above, but is also capable of being bent, without cracking, and when cooled will retain its shape as bent. Thus it is a material admirably suited to fabrication in the arts where an insulative substance of this class is desired.

While I have spoken above of the forming of my composition into panels, it will be understood that the composition may be moulded in closed moulds into complicated shapes as may be desired, and that metallic inserts and the like may be moulded into the articles.

The composition which I have given above is exemplary only of compositions which I may employ, and may be widely varied. While I have mentioned smoked sheet as a rubber source, other sources of natural rubber may be employed, and reclaimed rubbers may be used with or without new rubbers. Also chemically treated or polymerized rubbers—for example the polymerized rubber sold under the trade name "Marbon"—may be used, either as the sole binder constituent or along with natural rubbers. Diluents and modification agents may be employed in accordance with known practices without departing from the spirit of my invention; nor is my invention limited as to the nature of accelerators, anti-oxidants and the like which may be included in the composition. While I have indicated a composition in which both powdered resin and powdered hard rubber are employed, the resin may be employed as the sole filler, and in any amount up to the capacity of the binder to contain it, if that be desired. But other fillers, especially mineral fillers such as talc, mica and the like may be employed along with the resin, and in any or all of these ways a wide variety of materials suitable for a wide variety of specific electrical uses may be provided.

Powdered, completely polymerized, synthetic resin as a filler in rubber compositions of the class to which this invention relates, exhibits a number of peculiar properties. As has been indicated, either alone or in combination with other fillers it greatly reduces the cold flow and makes the material readily workable without upsetting or burring. It increases the die and tool life in working processes. It has a remarkable effect in preserving the power factor of the finished material or articles; and by means of its use I have been able to attain power factors superior to those of any rubber article or material of comparable physical characteristics. Finally, the resin as a filler appears to bond to the rubber binder in a way beyond the capabilities of other fillers, and the result is a composition having a tensile strength substantially as great as that of an unfilled hard rubber composition. The greater relative strengths of my materials will vary, of course, with the percentage of filler which is the powdered resin, in instances where other fillers are likewise employed; but in many instances the presence of the resin permits the use of other fillers also, where their use would not otherwise be permissible.

Modifications may be made in my invention without departing from the spirit of it. Having thus described my invention, what I claim as new and desire to secure by Letters Patent is:

A vulcanized hard rubber panel, substantially devoid of cold flow, and capable of being bent without cracking upon being warmed having a formula responding substantially to the following:

| | Pounds |
|---|---|
| Rubber | 50 |
| Lime | 2 |
| Accelerator | .5 |
| Cured phenolic resin powder | 20 |
| Hard rubber dust | 15 |
| Sulphur | 24 |

EDWARD R. DILLEHAY.